US009742033B2

(12) United States Patent
Abe et al.

(10) Patent No.: US 9,742,033 B2
(45) Date of Patent: Aug. 22, 2017

(54) NON-AQUEOUS ELECTROLYTIC SOLUTION AND LITHIUM BATTERY

(71) Applicant: UBE INDUSTRIES, LTD., Ube-shi (JP)

(72) Inventors: Koji Abe, Yamaguchi (JP); Takashi Hattori, Yamaguchi (JP); Yasuo Matsumori, Yamaguchi (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 0 days.

(21) Appl. No.: 15/388,170

(22) Filed: Dec. 22, 2016

(65) Prior Publication Data

US 2017/0104238 A1   Apr. 13, 2017

Related U.S. Application Data

(63) Continuation of application No. 14/256,377, filed on Apr. 18, 2014, which is a continuation of application No. 11/927,102, filed on Oct. 29, 2007, now abandoned, which is a continuation of application No. 10/619,005, filed on Jul. 15, 2003, now abandoned.

(30) Foreign Application Priority Data

Jul. 15, 2002   (JP) ................................ 2002-205560
Nov. 11, 2002   (JP) ................................ 2002-326391

(51) Int. Cl.
| | |
|---|---|
| *H01M 10/0567* | (2010.01) |
| *H01M 10/0525* | (2010.01) |
| *H01M 10/0569* | (2010.01) |
| *H01M 4/587* | (2010.01) |
| *H01M 4/485* | (2010.01) |
| *H01M 4/525* | (2010.01) |
| *H01M 4/505* | (2010.01) |

(52) U.S. Cl.
CPC ....... *H01M 10/0567* (2013.01); *H01M 4/485* (2013.01); *H01M 4/505* (2013.01); *H01M 4/525* (2013.01); *H01M 4/587* (2013.01); *H01M 10/0525* (2013.01); *H01M 10/0569* (2013.01); *H01M 2300/0028* (2013.01)

(58) Field of Classification Search
CPC ......... H01M 10/0566; H01M 10/0567; H01M 10/0568; H01M 10/0569
See application file for complete search history.

(56) References Cited

U.S. PATENT DOCUMENTS

| | | | |
|---|---|---|---|
| 4,221,674 A | 9/1980 | Vander Mey | |
| 4,475,994 A | 10/1984 | Gagne et al. | |
| 5,583,816 A | 12/1996 | McClure | |
| 5,795,437 A | 8/1998 | Muhr | |
| 5,815,432 A | 9/1998 | Naffziger et al. | |
| 5,946,264 A | 8/1999 | McClure | |
| 6,033,809 A * | 3/2000 | Hamamoto | H01M 10/0569 |
| | | | 429/338 |
| 6,045,952 A | 4/2000 | Kerr et al. | |
| 6,340,801 B1 | 1/2002 | Fukuda et al. | |
| 6,489,064 B2 | 12/2002 | Appel et al. | |
| 6,549,453 B2 | 4/2003 | Wong | |
| 2001/0044051 A1 | 11/2001 | Hamamoto et al. | |
| 2002/0045102 A1 | 4/2002 | Jung et al. | |
| 2002/0076605 A1 | 6/2002 | Akashi et al. | |
| 2002/0102466 A1 | 8/2002 | Hwang et al. | |
| 2003/0054258 A1 | 3/2003 | Ito et al. | |
| 2003/0148190 A1 | 8/2003 | Hamamoto et al. | |
| 2004/0076887 A1 | 4/2004 | Panitz et al. | |
| 2005/0026041 A1 | 2/2005 | Jouanncau et al. | |

FOREIGN PATENT DOCUMENTS

| | | | |
|---|---|---|---|
| CN | 1335653 A | | 2/2002 |
| CN | 1336696 A | | 2/2002 |
| CN | 1507668 A | | 6/2004 |
| JP | 5-13088 A | | 1/1993 |
| JP | 5-82139 A | | 4/1993 |
| JP | 07-176322 | | 7/1995 |
| JP | 07-176323 | | 7/1995 |
| JP | 8-96852 A | | 4/1996 |
| JP | 8-321312 A | | 12/1996 |
| JP | 09-161845 | | 6/1997 |
| JP | 09161845 A | * | 6/1997 |
| JP | 9-245834 A | | 9/1997 |
| JP | 10-21958 A | | 1/1998 |
| JP | 10-55818 A | | 2/1998 |
| JP | 10-189008 A | | 7/1998 |
| JP | 11-185806 A | | 7/1999 |
| JP | 11-329494 A | | 11/1999 |
| JP | 2000-3724 A | | 1/2000 |
| JP | 2000-3725 A | | 1/2000 |
| JP | 2000-77096 A | | 3/2000 |
| JP | 2000-208169 A | | 7/2000 |
| JP | 2000-243444 A | | 9/2000 |
| JP | 2001-243982 | | 9/2001 |
| JP | 2002-8721 A | | 1/2002 |
| JP | 2002-25611 A | | 1/2002 |
| JP | 2002-83632 A | | 3/2002 |
| JP | 2002-270230 A | | 9/2002 |
| WO | WO 02/071528 A2 | | 9/2002 |

OTHER PUBLICATIONS

Japanese Office Action issued on Jul. 6, 2012 in Patent Application No. 2009-140804 (with English translation).
Hiroaki Amahashi, et al., "Negative Electrode Material for Lithium-Ion Secondary Battery Using Natural Graphite as Base Material" Powder and Industry, vol. 34, No. 4, Apr. 2002, pp. 51-58.
"Denchi Binran (Battery Handbook)", The 3rd Edition, Maruzen Co., Ltd., Feb. 20, 2001, pp. 259-261.

* cited by examiner

*Primary Examiner* — Barbara Gilliam
*Assistant Examiner* — Nathanael Zemui
(74) *Attorney, Agent, or Firm* — Oblon, McClelland, Maier & Neustadt, L.L.P.

(57) ABSTRACT

A non-aqueous electrolytic solution comprising a non-aqueous solvent and an electrolyte, which further contains a combination of a nitrile compound and an S=O group-containing compound (or a dinitrile compound) in an amount of 0.001 to 10 wt. % imparts improved cycle performance and storage property to a lithium battery, particularly a lithium secondary battery.

16 Claims, No Drawings

NON-AQUEOUS ELECTROLYTIC SOLUTION AND LITHIUM BATTERY

CROSS REFERENCE TO RELATED APPLICATIONS

The present application is a continuation of U.S. patent application Ser. No. 14/256,377, filed on Apr. 18, 2014, which is a continuation of U.S. patent application Ser. No. 11/927,102, filed on Oct. 29, 2007, which is a continuation of U.S. patent application Ser. No. 10/619,005, filed on Jul. 15, 2003, which claims priority to Japanese patent application JP 2002-326391, filed Nov. 11, 2002, and Japanese patent application JP 2002-205560, filed Jul. 15, 2002.

FIELD OF THE INVENTION

This invention relates to a non-aqueous electrolytic solution favorably employable for a lithium battery such as a lithium primary battery or a lithium secondary battery. The invention further relates to a lithium battery showing improved battery performances, particularly, to a lithium primary battery having a high energy density and a low self-discharge ratio and a lithium secondary battery showing good cycle performance, high electric capacity and good storage endurance.

BACKGROUND OF THE INVENTION

At present, a non-aqueous secondary battery is generally employed as an electric source for driving small electronic devices. The non-aqueous secondary battery comprises a positive electrode, a negative electrode, and a non-aqueous electrolytic solution. The non-aqueous lithium secondary battery generally comprises a positive electrode of lithium complex oxide such as $LiCoO_2$, $LiMn_2O_4$ or $LiNiO_2$, a non-aqueous electrolytic solution such as a solution of electrolyte in a carbonate solvent such as ethylene carbonate (EC), propylene carbonate (PC), dimethyl carbonate (DMC), diethyl carbonate (DEC), or methyl ethyl carbonate (MEC), and a negative electrode of carbonaceous material or lithium metal.

Also known is a lithium primary battery comprising a positive electrode of, for instance, manganese dioxide and a negative electrode of, for instance, lithium metal and showing a high energy density.

The non-aqueous secondary battery preferably has good battery performances such as large electric discharge capacity and high electric discharge retention (i.e., good cycle characteristics). However, there are observed certain problems in the known non-aqueous secondary battery. For instance, in the non-aqueous lithium ion secondary battery using a positive electrode of $LicoO_2$, $LiMn_2O_4$, or $LiNiO_2$, oxidative decomposition of a portion of the non-aqueous electrolytic solution undergoes in the electric charging stage. The decomposition product disturbs electrochemical reaction so that the electric discharge capacity decreases. It is considered that the oxidative decomposition is caused in the non-aqueous solvent of the non-aqueous electrolytic solution on the interface between the positive electrode and the electrolytic solution.

Moreover, in the non-aqueous lithium secondary battery particularly using negative electrode of carbonaceous material of high crystallinity such as natural graphite or artificial (or synthetic) graphite, reductive decomposition of the solvent of the non-aqueous electrolytic solution undergoes on the surface of the negative electrode in the charging stage.

The reductive decomposition on the negative electrode undergoes after repeated charging-discharging procedures even in the case of using ethylene carbonate (EC) which is generally employed in the electrolytic solution.

JP-A-3-289062 proposes to incorporate 0.2 to 10 vol. % of 1,4-dimethoxybenzene compound into a non-aqueous solvent comprising a high permittivity solvent such as ethylene carbonate (EC) or propylene carbonate (PC) and a low permittivity solvent such as tetrahydrofuran (THF) so that the cycle characteristics can be improved.

U.S. Pat. No. 5,256,504 and U.S. Pat. No. 5,474,862 propose to incorporate ethyl propionate into a combination of ethylene carbonate and diethyl carbonate (DEC) so that the cycle characteristics can be improved.

JP-A-9-161845 proposes a lithium secondary battery which employs a combination of a high activity solvent having a donor number of 14 to 20 and a low activity solvent having a donor number of 10 or lower. This patent publication describes the use of a negative electrode comprising a carbonaceous material of a graphite crystal structure having a lattice distance ($d_{002}$) of lattice surface (002) of 0.3365 nanometer or more. The patent publication further describes that the high activity solvent can be a cyclic carbonate ester, a cyclic ester, a linear esher, a cyclic ether, a linear ether, or a nitrile. The nitrile can be a dinitrile such as glutaronitrile or adiponitrile. It is noted that in Example 6 the glutaronitrile is employed in an amount of 19 vol. % in a non-aqueous solvent for preparing a electrolytic solution.

SUMMARY OF THE INVENTION

It is an object of the present invention to provide a non-aqueous electrolytic solution which is favorably employable for producing a lithium battery showing improved battery performances such as good cycle performance, a high electric capacity, good storage endurance, and a high electric conductivity.

It is another object of the invention to provide a lithium primary or secondary battery showing improved battery performances such as good cycle performance, a high electric capacity, good storage endurance, and a high electric conductivity.

The invention resides in a non-aqueous electrolytic solution comprising a non-aqueous solvent and an electrolyte, which further contains a nitrile compound and an S=O group-containing compound.

The invention further resides in a non-aqueous electrolytic solution comprising a non-aqueous solvent and an electrolyte, which further contains a dinitrile compound in an amount of 0.001 to 10 wt. %.

The invention furthermore resides in a lithium battery comprising a positive electrode, a negative electrode comprising a carbonaceous material of a graphite crystal structure having a lattice distance of lattice surface (002) of 0.34 nanometer or less and one of the above-mentioned non-aqueous electrolytic solution of the invention.

DETAILED DESCRIPTION OF THE INVENTION

In the non-aqueous solvent employed for producing a non-aqueous electrolytic solution of the invention, a mononitrile compound or a dinitrile compound is contained. The mononitrile compound preferably has a linear or branched alkyl chain having 1 to 12 carbon atoms which may have one or more substituents or an aromatic group and can be acetonitrile, propionitrile, butylonitrile, valeronitrile, hexanenitrile, octanenitrile, undecanenitrile, decanenitrile, cyclohexanecarbonitrile, benzonitrile, or phenylacetonitrile.

The dinitrile compound preferably has a linear or branched alkylene chain having 1 to 12 carbon atoms which may have one or more substituents or an aromatic group and can be succinonitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylsuccinonitrile, 2-methylglutaronitrile, 2,4-dimethylglutaronitrile, 2,2,4,4-tetramethylglutaronitrile, 1,4-dicyanopentane, 2,5-dimethyl-2,5-hexanedicarbonitrile, 2,6-dicyanoheptane, 2,7-dicyanooctane, 2,8-dicyanononane, 1,6-dicyanodecane, 1,2-dicyanobenzene, 1,3-dicyanobenzene, or 1,4-dicyanobenzene.

In the invention, the mononitrile compound should be used in combination with an S=O group-containing compound.

The dinitrile compound can be used not in combination with the S=O group-containing compound, under the condition that the dinitrile compound should be contained in the electrolytic solution in such a small amount as 0.001 to 10 wt. %, preferably 0.01 to 5 wt. %, more preferably 0.01 to 3 wt. %, most preferably 0.01 to 2 wt. %.

The incorporation of a dinitrile compound into an electrolytic solution is effective to reduce erosion of a metallic inner surface of a battery case. If an S=O group-containing compound is incorporated in the electrolytic solution in combination with a dinitrile compound, the effect to reduce the erosion of a metallic inner surface of a battery case becomes more prominent.

The S=O group-containing compound can be a cyclic compound or a linear compound and can be dimethylsulfite, diethylsulfite, ethylenesulfite, propylenesulfite, vinylenesulfite, dimethylsulfone, diethylsulfone, methylethylsulfone, divinylsulfone, sulforane, sulforene, methyl methanesulfonate, ethylmethanesulfonate, propargyl methanesulfonate, methyl benzenesulfonate, 1,3-propanesultone, 1,4-butanesultone, dimethyl sulfate, diethyl sulfate, ethyleneglycol sulfate, or 1,2-propanediol sulfate.

When the electrolytic solution contains a nitrile compound and an S=O group-containing compound in combination, the nitrile compound is preferably contained in the electrolytic solution in an amount of 0.001 to 10 wt. %, more preferably 0.01 to 5 wt. %, more preferably 0.01 to 3 wt. %, most preferably 0.01 to 2 wt. %. The S=O group-containing compound is preferably contained in an amount of 4 wt. % or less, more preferably in the range of 0.2 to 3 wt. %. The nitrile compound and the S=O group-containing compound are contained preferably in a weight ratio of 1:99 to 99:1, more preferably 9:1 to 1:9, 9:1 to 3:7.

The non-aqueous solvent of the electrolytic solution of the invention preferably comprises at least one compound selected from the group consisting of a cyclic carbonate, a cyclic ester, a linear carbonate, and an ether.

Preferred examples of the cyclic carbonates include ethylene carbonate (EC), propylene carbonate (PC), butylene carbonate (BC), and vinylene carbonate (VC).

Preferred examples of the cyclic esters include lactones such as γ-butyrolactone (GBL).

Preferred examples of the linear carbonates include dimethyl carbonate (DMC), methyl ethyl carbonate (MEC), diethyl carbonate (DEC), dipropyl carbonate (DPC), and dibutyl carbonate (DBC).

Preferred examples of the ethers include cyclic ethers such as tetrahydrofuran (THF), 2-methyltetrahydrofuran (2-MeTHF), and 1,4-dioxane (1,4-DOX) and linear ethers such as 1,2-dimethoxyethane (DME), 1,2-diethoxyethane (DEE), and 1,2-dibutoxyethane (DBE).

In the solvent, these compounds can be used singly or in any combinations. Moreover, one or more of other solvents such as other esters, e.g., methyl propionate, ethyl pivalate, butyl pivalate, hexyl pivalate, octyl pivalate, or dodecyl pivalate, can be used in combination.

When a cyclic carbonate and a linear carbonate is employed in combination, they are preferably employed in a volume ratio of 1:9 to 9:1 (cyclic carbonate:linear carbonate), more preferably 1:4 to 1:1.

When a cyclic carbonate and an ether is employed in combination, they are preferably employed in a volume ratio of 1:9 to 9:1 (cyclic carbonate:ether), more preferably 1:4 to 1:1.

When a cyclic carbonate and a cyclic ester is employed in combination, they are preferably employed in a volume ratio of 1:99 to 99:1 (cyclic carbonate:cyclic ester), more preferably 1:9 to 9:1, most preferably 1:4 to 1:1.

Examples of the electrolytes to be incorporated into the non-aqueous solvent include $LiPF_6$, $LiBF_4$, $LiAsF_6$, $LiClO_4$, $LiOSO_2CF_3$, $LiN(SO_2CF_3)_2$, $LiN(SO_2C_2F_5)_2$, $LiC(SO_2CF_3)_3$, $LiPF_4(CF_3)_2$, $LiPF_3(CF_3)_3$, $LiPF_3(C_2F_5)_3$, $LiPF_5(iso-C_3F_7)$, $LiPF_4(iso-C_3F_7)_2$, and $LiBF_3(C_2F_5)$. The electrolytes can be employed singly or in combination. Generally, the electrolyte can be incorporated into the non-aqueous solvent in such an amount to give an electrolytic solution of 0.1 M to 3 M, preferably 0.5 M to 1.5 M.

A non-aqueous secondary battery of the invention comprises a positive electrode and a negative electrode in addition to the non-aqueous electrolytic solution.

The positive electrode generally comprises a positive electrode active material and an electro-conductive binder composition.

The positive electrode active material for a lithium secondary battery preferably is a complex metal oxide containing one metal element selected from the group consisting of cobalt, manganese, nickel, chromium, iron, and vanadium and a lithium element. Examples of the complex metal oxides include $LiCoO_2$, $LiMn_2O_4$, $LiNiO_2$ and $LiCO_{1-x}Ni_xO_2$ (0.01<x<1).

The positive electrode active material for a lithium primary battery preferably is an oxide of one or more metals or a calcogen compound such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$, or CoO, a sulfur compound such a $SO_2$ or $SOCl_2$, or carbon fluoride having a formula of $(CF_x)_n$. Preferred are $MnO_2$, $V_2O_5$, and carbon fluoride.

The electro-conductive binder composition can be produced by a mixture of an electro-conductive material such as acetylene black or carbon black, a binder such as poly (tetrafluoroethylene) (PTFE), poly(vinylidene fluoride) (PVDF), styrene-butadiene copolymer (SBR), acrylonitrile-butadiene copolymer (NBR) or carboxymethylcellulose (CMC), and a solvent. For the preparation of a positive electrode, the mixture is coated on a metal plate such as aluminum foil or stainless plate, dried, and pressed for molding. The molded product is then heated in vacuo at a temperature of approx. 50 to 250° C. for approx. 2 hours, to give the desired positive electrode.

The negative electrode comprises a negative electrode active material such as a lithium metal, a lithium alloy, carbonaceous material having a graphite-type crystalline structure which can absorb and release lithium ion, or a complex tin oxide. Examples of the carbonaceous materials include thermally decomposed carbonaceous materials, cokes, graphites (e.g., artificial graphite and natural graphite), fired organic polymer materials, and carbon fibers. Preferred are carbonaceous materials having a graphite-type crystalline structure in which the lattice distance of lattice surface (002), namely, $d_{002}$, is 0.34 nm (nanometer) or less, preferably 0.336 nm or less.

The negative electrode active material in the powdery form such as carbonaceous powder is preferably used in combination with a binder such as ethylene propylene diene terpolymer (EPEM), polytetrafluoroethylene (PTFE), poly (vinylidene fluoride) (PVDF), styrene-butadiene copolymer (SBR), acrylonitrile-butadiene copolymer (NBR) or carboxymethylcellulose (OCMC).

There are no specific limitations with respect to the structure of the non-aqueous lithium battery of the invention. For instance, the non-aqueous secondary battery can be a battery of coin type comprising a positive electrode, a negative electrode, and single or plural separators, or a cylindrical or prismatic battery comprising a positive electrode, a negative electrode, and a separator roll. The separator can be a known microporous polyolefin film, woven fabric, or non-woven fabric.

The present invention is further described by the following non-limiting examples.

Incorporation of Dinitrile Compound into Electrolytic Solution for Lithium Secondary Battery Example A-1

1) Preparation of Non-Aqueous Electrolytic Solution

In a non-aqueous mixture of ethylene carbonate and methyl ethyl carbonate [EC:MEC=3:7, volume ratio] was dissolved $LiPF_6$ to give a non-aqueous electrolytic solution of 1 M concentration. To the electrolytic solution was added adiponitrile in an amount of 0.01 wt. % (based on the amount of the electrolytic solution).

2) Preparation of Lithium Secondary Battery and Measurement of its Battery Characteristics $LiCoO_2$ (positive electrode active material, 90 wt. %), acetylene black (electro-conductive material, 5 wt. %), and poly(vinylidene fluoride) (binder, 5 wt. %) were mixed. To the resulting mixture was further added 1-methyl-2-pyrrolidone (solvent). Thus produced positive electrode mixture was coated on aluminum foil, dried, molded under pressure, and heated to give a positive electrode.

A natural graphite (negative electrode active material, $d_{002}$=0.3354 nm, 90 wt. %) and poly(vinylidene fluoride) (binder, 10 wt. %) were mixed. To the resulting mixture was further added 1-methyl-2-pyrrolidone (solvent). Thus produced negative electrode mixture was coated on copper foil, dried, molded under pressure, and heated to give a negative electrode.

The positive and negative electrodes, a microporous polypropylene film separator, and the non-aqueous electrolytic solution were combined to give a coin-type battery (diameter: 20 mm, thickness: 3.2 mm).

The coin-type battery was charged at room temperature (20° C.) with a constant electric current (0.8 mA, per electrode area) to reach 4.2 V and then the charging was continued under a constant voltage of 4.2 V. In total, the charging was performed for 5 hours. Subsequently, the battery was discharged to give a constant electric current (0.8 mA). The discharge was continued to give a terminal voltage of 2.7 V. The charge-discharge cycle was repeated 100 times.

The initial discharge capacity was 1.00 time as much as that measured in a battery using an EC/MEC (3/7) solvent mixture (containing 1M $LiPF_6$ but no adiponitrile) [see Comparison Example A-1].

After the 100 cycle charge-discharge procedure was complete, the discharge capacity became 86.2% of the initial discharge capacity.

The preparation and evaluation of the battery are summarized in Table 1.

After the evaluation on battery performances was complete, the battery was disassembled to observe the inner surface of the battery case. The case had the same glossy inner surface as that observed before the electrolytic solution was placed.

Example A-2

The procedures of Example A-1 were repeated except that adiponitrile was incorporated into the electrolytic solution in an amount of 0.05 wt. %, to prepare a coin-type battery.

The initial discharge capacity was 0.99 time as much as that measured in a battery of Comparison Example A-1. After the 100 cycle charge-discharge procedure was complete, the discharge capacity became 87.9% of the initial discharge capacity.

The preparation and evaluation of the battery are summarized in Table 1.

Example A-3

The procedures of Example A-1 were repeated except that adiponitrile was incorporated into the electrolytic solution in an amount of 0.1 wt. %, to prepare a coin-type battery.

The initial discharge capacity was 1.01 times as much as that measured in a battery of Comparison Example A-1. After the 100 cycle charge-discharge procedure was complete, the discharge capacity became 89.0% of the initial discharge capacity.

The preparation and evaluation of the battery are summarized in Table 1.

Example A-4

The procedures of Example A-1 were repeated except that adiponitrile was incorporated into the electrolytic solution in an amount of 0.2 wt. %, to prepare a coin-type battery.

The initial discharge capacity was 1.02 times as much as that measured in a battery of Comparison Example A-1. After the 100 cycle charge-discharge procedure was complete, the discharge capacity became 89.2% of the initial discharge capacity.

The preparation and evaluation of the battery are summarized in Table 1.

After the evaluation on battery performances was complete, the battery was disassembled to observe the inner surface of the battery case. The case had the same glossy inner surface as that observed before the electrolytic solution was placed.

Example A-5

The procedures of Example A-1 were repeated except that adiponitrile was incorporated into the electrolytic solution in an amount of 0.5 wt. %, to prepare a coin-type battery.

The initial discharge capacity was 0.99 time as much as that measured in a battery of Comparison Example A-1. After the 100 cycle charge-discharge procedure was complete, the discharge capacity became 88.8% of the initial discharge capacity.

The preparation and evaluation of the battery are summarized in Table 1.

Example A-6

The procedures of Example A-1 were repeated except that adiponitrile was incorporated into the electrolytic solution in an amount of 1 wt. %, to prepare a coin-type battery.

The initial discharge capacity was 0.98 time as much as that measured in a battery of Comparison Example A-1. After the 100 cycle charge-discharge procedure was complete, the discharge capacity became 85.6% of the initial discharge capacity.

The preparation and evaluation of the battery are summarized in Table 1.

Comparison Example A-1

The procedures of Example A-1 were repeated except that no adiponitrile was incorporated into the electrolytic solution, to prepare a coin-type battery.

After the 100 cycle charge-discharge procedure was complete, the discharge capacity became 82.6% of the initial discharge capacity.

The preparation and evaluation of the battery are summarized in Table 1.

After the evaluation on battery performances was complete, the battery was disassembled to observe the inner surface of the battery case. The case had no glossy inner surface like that observed before the electrolytic solution was placed. Microscopic observation revealed that the inner surface had eroded spots.

Comparison Example A-2

The procedures of Example A-1 were repeated except that adiponitrile was incorporated into the electrolytic solution in an amount of 13 wt. %, to prepare a coin-type battery.

The initial discharge capacity was 0.95 time as much as that measured in a battery of Comparison Example A-1. After the 100 cycle charge-discharge procedure was complete, the discharge capacity became 72.3% of the initial discharge capacity.

The preparation and evaluation of the battery are summarized in Table 1.

Example A-7

The procedures of Example A-1 were repeated except that glutaronitrile was incorporated in place of adiponitrile into the electrolytic solution in an amount of 0.2 wt. %, to prepare a coin-type battery.

The initial discharge capacity was 1.00 time as much as that measured in a battery of Comparison Example A-1. After the 100 cycle charge-discharge procedure was complete, the discharge capacity became 88.9% of the initial discharge capacity.

The preparation and evaluation of the battery are summarized in Table 1.

Comparison Example A-3: Trace of Example 6 of JP-A-9-161845

The procedures of Example A-1 were repeated except that the non-aqueous solvent composition was replaced with a combination of glutaronitrile and dimethyl carbonate (19:81, volume ratio), to prepare a coin-type battery.

The initial discharge capacity was 1.01 times as much as that measured in a battery of Comparison Example A-1. After the 100 cycle charge-discharge procedure was complete, the discharge capacity became 64.7% of the initial discharge capacity.

The preparation and evaluation of the battery are summarized in Table 1.

Comparison Example A-4

The procedures of Example A-1 were repeated except that adiponitrile was replaced with 0.2 wt. % of propionitrile, to prepare a coin-type battery.

The initial discharge capacity was 0.96 time as much as that measured in a battery of Comparison Example A-1. After the 100 cycle charge-discharge procedure was complete, the discharge capacity became 82.4% of the initial discharge capacity.

The preparation and evaluation of the battery are summarized in Table 1.

TABLE 1

| | Nitrile compound (wt. %) | Initial discharge capacity (R.V.) | Discharge capacity retention (%) |
|---|---|---|---|
| Example | | | |
| A-1 | Adiponitrile (0.01) | 1.00 | 86.2 |
| A-2 | Adiponitrile (0.05) | 0.99 | 87.9 |
| A-3 | Adiponitrile (0.1) | 1.01 | 89.0 |
| A-4 | Adiponitrile (0.2) | 1.02 | 89.2 |
| A-5 | Adiponitrile (0.5) | 0.99 | 88.8 |
| A-6 | Adiponitrile (1) | 0.98 | 85.6 |
| A-7 | Glutaronitrile (0.2) | 1.00 | 88.9 |
| Comparison | | | |
| A-1 | None | 1 | 82.6 |
| A-2 | Adiponitrile (13) | 0.95 | 72.3 |
| A-3 | [Glutaronitrile (19)] | 1.01 | 64.7 |
| A-4 | Propionitrile (0.2) | 0.96 | 82.4 |

Remarks: Comparison Example A-3 uses glutaronitrile/methyl carbonate (19:81, vol. ratio) and 1 mol/L $LiPF_6$. R.V. means "Relative Value".

Example A-83

1) Preparation of Non-Aqueous Electrolytic Solution

In a non-aqueous mixture of ethylene carbonate and γ-butyrolactone [EC:GBL=3:7, volume ratio] was dissolved $LiBF_4$ to give a non-aqueous electrolytic solution of 1.5 M concentration. To the electrolytic solution were added n-butyl pivalate (separator-wetting improver) and adiponitrile in amounts of 5 wt. % and 0.2 wt. % (based on the amount of the electrolytic solution), respectively.

2) Preparation of Lithium Secondary Battery and Measurement of its Battery Characteristics The procedures of Example A-1 were repeated except that the above-prepared electrolytic solution was used, to prepare a coin-type battery.

The initial discharge capacity was 0.96 time as much as that measured in a battery of Comparison Example A-1. After the 100 cycle charge-discharge procedure was complete, the discharge capacity became 70.1% of the initial discharge capacity.

The preparation and evaluation of the battery are summarized in Table 2.

Example A-9

1) Preparation of Non-Aqueous Electrolytic Solution

In a non-aqueous γ-butyrolactone solvent was dissolved $LiBF_4$ to give a non-aqueous electrolytic solution of 1.5 M concentration. To the electrolytic solution were added n-butyl pivalate (separator-wetting improver) and adiponitrile in amounts of 5 wt. % and 0.2 wt. % (based on the amount of the electrolytic solution), respectively.

2) Preparation of Lithium Secondary Battery and Measurement of its Battery Characteristics The procedures of Example A-1 were repeated except that the above-prepared electrolytic solution was used, to prepare a coin-type battery.

The initial discharge capacity was 0.98 time as much as that measured in a battery of Comparison Example A-1. After the 100 cycle charge-discharge procedure was complete, the discharge capacity became 67.3% of the initial discharge capacity.

The preparation and evaluation of the battery are summarized in Table 2.

Comparison Example A-5

1) Preparation of Non-Aqueous Electrolytic Solution

In a non-aqueous mixture of ethylene carbonate and γ-butyrolactone [EC:GBL=3:7, volume ratio] was dissolved $LiBF_4$ to give a non-aqueous electrolytic solution of 1.5 M concentration. To the electrolytic solution was added n-butyl pivalate (separator-wetting improver) in an amount of 5 wt. % (based on the amount of the electrolytic solution), but added no dinitrile compound.

2) Preparation of Lithium Secondary Battery and Measurement of its Battery Characteristics The procedures of Example A-1 were repeated except that the above-prepared electrolytic solution was used, to prepare a coin-type battery.

The initial discharge capacity was 0.97 time as much as that measured in a battery of Comparison Example A-1. After the 100 cycle charge-discharge procedure was complete, the discharge capacity became 61.4% of the initial discharge capacity.

The preparation and evaluation of the battery are summarized in Table 2.

Comparison Example A-6

1) Preparation of Non-Aqueous Electrolytic Solution

In a non-aqueous γ-butyrolactone solvent was dissolved $LiBF_4$ to give a non-aqueous electrolytic solution of 1.5 M concentration. To the electrolytic solution was added n-butyl pivalate (separator-wetting improver) in an amount of 5 wt. % (based on the amount of the electrolytic solution), but added no dinitrile compound.

2) Preparation of Lithium Secondary Battery and Measurement of its Battery Characteristics The procedures of Example A-1 were repeated except that the above-prepared electrolytic solution was used, to prepare a coin-type battery.

The initial discharge capacity was 1.00 time as much as that measured in a battery of Comparison Example A-1. After the 100 cycle charge-discharge procedure was complete, the discharge capacity became 59.5% of the initial discharge capacity.

The preparation and evaluation of the battery are summarized in Table 2.

TABLE 2

| | Nitrile compound (wt. %) | Initial discharge capacity (R.V.) | Discharge capacity retention (%) |
|---|---|---|---|
| Example | | | |
| A-8 | Adiponitrile (0.2) | 0.96 | 70.1 |
| A-9 | Adiponitrile (0.2) | 0.98 | 67.3 |
| Comparison | | | |
| A-5 | None | 0.97 | 61.4 |
| A-6 | None | 1.00 | 59.5 |

Remarks: Example A-8 and Comparison Example A-5 use EC/GBL (3:7) solvent, and Example A-9 and Comparison Example A-6 use GBL solvent.

Summary of Evaluations

The results of Examples A-1 to A-6 and Comparison Examples A-1 and A-2 indicate that the use of the electrolytic solution containing an appropriate amount of a dinitrile compound gives a favorably effect to a lithium secondary battery (enhancement of a discharge capacity retention without lowering the initial discharge capacity after a long term charge-discharge cycles) as compared with an electrolytic solution containing no dinitrile compound. The results of Comparison Examples A-2 and A-3 indicate that the use of a dinitrile compound in an excessive amount gives an adverse effect to the battery performances. The results of Comparison Example A-4 indicate that the use of a mono-nitrile compound in place of a dinitrile compound give almost no favorable effect to the discharge capacity retention.

In summary, the incorporation of an appropriate amount of a dinitrile compound into a non-aqueous electrolytic solution gives favorably effects to battery performances such as discharge capacity retention by forming a protective film on metallic supports of the positive and negative electrodes and a battery case and hence keeping conductivity between the electrode active material and metallic support from lowering.

Incorporation of Dinitrile Compound into Electrolytic Solution for Lithium Primary Battery Example B-1

1) Preparation of Non-Aqueous Electrolytic Solution

In a non-aqueous mixture of propylene carbonate and 1,2-dimethoxyethane [PC:DME=1:1, volume ratio] was dissolved $LiOSO_2CF_3$ to give a non-aqueous electrolytic solution of 1.0 M concentration. To the electrolytic solution was added adiponitrile in an amount of 0.2 wt. % (based on the amount of the electrolytic solution).

2) Preparation of Lithium Primary Battery and Measurement of its Battery Characteristics $MnO_2$ (positive electrode active material, 85 wt. %), acetylene black (electro-conductive material, 10 wt. %), and poly(vinylidene fluoride) (binder, 5 wt. %) were mixed. To the resulting mixture was further added 1-methyl-2-pyrrolidone (solvent). Thus produced positive electrode mixture was coated on aluminum foil, dried, molded under pressure, and heated to give a positive electrode.

A lithium metal foil (negative electrode material) having a thickness of 0.2 mm was punched out to give a disc which was then pressed on a negative electrode collector to give a negative electrode.

The positive and negative electrodes, a microporous polypropylene film separator, and the non-aqueous electrolytic solution were combined to give a coin-type battery (diameter: 20 mm, thickness: 3.2 m).

The prepared coin-type battery was subjected to the following capacity test and high temperature storage test.

[Capacity Test]

The coin-type battery was charged at room temperature (20° C.) with a constant electric current (0.5 mA per an electrode area) to reach 3.5 V. Subsequently, the battery was discharged to give a constant electric current (1.0 mA). The discharge was continued to give a terminal voltage of 2.4 V, to measure a discharge capacity.

[High Temperature Storage Test]

The coin-type battery was charged at room temperature (20° C.) with a constant electric current (0.5 mA per electrode area) to reach 3.5 V. Subsequently, the battery was kept in a thermostat at 60° C. for 20 days. Then, the battery was discharged to give a constant electric current (1.0 mA). The discharge was continued to give a terminal voltage of 2.4 V, to measure a discharge capacity. A self discharge ratio in the high temperature storage was calculated from thus measured discharge capacity and the discharge capacity measured at room temperature.

The discharge capacity was 1.04 time as much as that measured in a battery using a PC/DME (1/1) solvent mixture (containing 1.0 M $LiOSO_2CF_3$, but no adiponitrile) [see Comparison Example B-1]. The self-discharge ratio in the high temperature storage was 6.2%.

The preparation and evaluation of the battery are summarized in Table 3.

After the high temperature storage evaluation was complete, the battery was disassembled to observe the inner surface of the battery case. The case had the same glossy inner surface as that observed before the electrolytic solution was placed.

Comparison Example B-1

The procedures of Example B-1 were repeated except that no adiponitrile was incorporated in the electrolytic solution, to prepare a coin-type battery.

The prepared coin-type battery was subjected to the capacity test and high temperature storage test. The self-discharge ratio in the high temperature storage was 10.5%.

The preparation and evaluation of the battery are summarized in Table 3.

After the high temperature storage evaluation was complete, the battery was disassembled to observe the inner surface of the battery case. The case had no glossy inner surface like that observed before the electrolytic solution was placed. Microscopic observation revealed that the inner surface had eroded spots.

Comparison Example B-2

The procedures of Example B-1 were repeated except that adiponitrile was incorporated into the electrolytic solution in an amount of 13 wt. %, to prepare a coin-type battery.

The prepared coin-type battery was subjected to the capacity test and high temperature storage test.

The discharge capacity was 0.92 time as much as that measured in Comparison Example B-1. The self-discharge ratio in the high temperature storage was 22.8%.

The preparation and evaluation of the battery are summarized in Table 3.

After the high temperature storage evaluation was complete, the battery was disassembled to observe the inner surface of the battery case. The case had the same glossy inner surface as that observed before the electrolytic solution was placed.

TABLE 3

|  | Nitrile compound (wt. %) | Discharge capacity (R.V.) | High temperature self-discharge ratio (%) |
| --- | --- | --- | --- |
| Example |  |  |  |
| B-1 | Adiponitrile (0.2) | 1.04 | 6.2 |
| Comparison |  |  |  |
| B-1 | None | 1 | 10.5 |
| B-2 | Adiponitrile (13) | 0.92 | 22.8 |

Incorporation of Nitrile Compound and S=O Group-Containing Compound into Electrolytic Solution for Lithium Secondary Battery Example C-1

1) Preparation of Non-Aqueous Electrolytic Solution

In a non-aqueous mixture of ethylene carbonate, vinylene carbonate, and methyl ethyl carbonate [EC:VC:MEC=28:2:70, volume ratio] was dissolved $LiPF_6$ to give a non-aqueous electrolytic solution of 1 M concentration. To the electrolytic solution were added 1,4-dicyanobenzene and ethylene sulfite in amounts of 2 wt. % and 2 wt. % (based on the amount of the electrolytic solution), respectively.

2) Preparation of Lithium Secondary Battery and Measurement of its Battery Characteristics A coin-type battery was prepared using the above-obtained electrolytic solution in the same manner as described in Example A-1, and the battery performances were measured in the same manner.

The initial discharge capacity was 1.00 time as much as that measured in a battery using an EC/VC/MEC(28/2/70) solvent mixture (containing 1M $LiPF_6$ but neither 1,4-dicyanobenzene nor ethylene sulfite) [see Comparison Example C-1].

After the 100 cycle charge-discharge procedure was complete, the discharge capacity became 88.9% of the initial discharge capacity.

The preparation and evaluation of the battery are summarized in Table 4.

After the evaluation on battery performances was complete, the battery was disassembled to observe the inner surface of the battery case. The case had the same glossy inner surface as that observed before the electrolytic solution was placed.

Comparison Example C-1

The procedures of Example C-1 were repeated except that neither 1,4-dicyanobenzene nor ethylene sulfite was incorporated into the electrolytic solution, to prepare a coin-type battery.

After the 100 cycle charge-discharge procedure was complete, the discharge capacity became 83.7% of the initial discharge capacity.

The preparation and evaluation of the battery are summarized in Table 4.

After the evaluation on battery performances was complete, the battery was disassembled to observe the inner surface of the battery case. The case had no glossy inner surface like that observed before the electrolytic solution was placed. Microscopic observation revealed that the inner surface had eroded spots.

Example C-2

The procedures of Example C-1 were repeated except that 1,4-dicyanobenzene was replaced with adiponitrile, to prepare a coin-type battery.

The initial discharge capacity was 1.00 time as much as that measured in a battery of Comparison Example C-1. After the 100 cycle charge-discharge procedure was complete, the discharge capacity became 90.2% of the initial discharge capacity.

The preparation and evaluation of the battery are summarized in Table 4.

After the evaluation on battery performances was complete, the battery was disassembled to observe the inner surface of the battery case. The case had the same glossy inner surface as that observed before the electrolytic solution was placed.

Example C-3

The procedures of Example C-2 were repeated except that 3M of $LiPF_6$ was replaced with a combination of 0.9M of $LiPF_6$ and 0.1M of $LiN(SO_2CF_3)_2$, to prepare a coin-type battery.

After the 100 cycle charge-discharge procedure was complete, the discharge capacity became 89.4% of the initial discharge capacity.

The preparation and evaluation of the battery are summarized in Table 4.

After the evaluation on battery performances was complete, the battery was disassembled to observe the inner surface of the battery case. The case had the same glossy inner surface as that observed before the electrolytic solution was placed.

Example C-4

The procedures of Example C-2 were repeated except that 1M of $LiPF_6$ was replaced with a combination of 0.9M of $LiPF_6$ and 0.1M of $LiBF_4$, to prepare a coin-type battery.

After the 100 cycle charge-discharge procedure was complete, the discharge capacity became 89.7% of the initial discharge capacity.

The preparation and evaluation of the battery are summarized in Table 4.

After the evaluation on battery performances was complete, the battery was disassembled to observe the inner surface of the battery case. The case had the same glossy inner surface as that observed before the electrolytic solution was placed.

Example C-5

The procedures of Example C-2 were repeated except that ethylene sulfite was replaced with 1,3-propanesultone, to prepare a coin-type battery.

The initial discharge capacity was 1.00 time as much as that measured in a battery of Comparison Example C-1. After the 100 cycle charge-discharge procedure was complete, the discharge capacity became 89.8% of the initial discharge capacity.

The preparation and evaluation of the battery are summarized in Table 4.

After the evaluation on battery performances was complete, the battery was disassembled to observe the inner surface of the battery case. The case had the same glossy inner surface as that observed before the electrolytic solution was placed.

Example C-6

The procedures of Example C-2 were repeated except that 2 wt. % of ethylene sulfite was replaced with 0.3 wt. % of divinylsulfone, to prepare a coin-type battery.

The initial discharge capacity was 1.00 time as much as that measured in a battery of Comparison Example C-1. After the 100 cycle charge-discharge procedure was complete, the discharge capacity became 89.4% of the initial discharge capacity.

The preparation and evaluation of the battery are summarized in Table 4.

After the evaluation on battery performances was complete, the battery was disassembled to observe the inner surface of the battery case. The case had the same glossy inner surface as that observed before the electrolytic solution was placed.

Example C-7

The procedures of Example C-2 were repeated except that 2 wt. % of ethylene sulfite was replaced with 0.5 wt. % of propargyl methanesulfonate, to prepare a coin-type battery.

The initial discharge capacity was 1.00 time as much as that measured in a battery of Comparison Example C-1. After the 100 cycle charge-discharge procedure was complete, the discharge capacity became 89.3% of the initial discharge capacity.

The preparation and evaluation of the battery are summarized in Table 4.

After the evaluation on battery performances was complete, the battery was disassembled to observe the inner surface of the battery case. The case had the same glossy inner surface as that observed before the electrolytic solution was placed.

Comparison Example C-2

The procedures of Example C-2 were repeated except that no 1,4-cyanobenzene was used, to prepare a coin-type battery.

The initial discharge capacity was 1.00 time as much as that measured in a battery of Comparison Example C-1. After the 100 cycle charge-discharge procedure was complete, the discharge capacity became 84.2% of the initial discharge capacity.

The preparation and evaluation of the battery are summarized in Table 4.

After the evaluation on battery performances was complete, the battery was disassembled to observe the inner surface of the battery case. The case had no glossy inner surface like that observed before the electrolytic solution was placed. Microscopic observation revealed that the inner surface had eroded spots.

Example C-8

The procedures of Example C-1 were repeated except that 1,4-dicyanobenzene was replaced with propionitrile, to prepare a coin-type battery.

The initial discharge capacity was 1.00 time as much as that measured in a battery of Comparison Example C-1. After the 100 cycle charge-discharge procedure was complete, the discharge capacity became 88.2% of the initial discharge capacity.

The preparation and evaluation of the battery are summarized in Table 4.

TABLE 4

| Example | Electrolytic solution Nitrile compound(wt. %) $SO_2$-containing compound(wt. %) | Initial discharge capacity (R.V.) | Discharge capacity retention (%) |
|---|---|---|---|
| C-1 | 1M $LiPF_6$ in EC/VC/MEC<br>1,4-Dicyanobenzene (2)<br>Ethylene sulfite (2) | 1.00 | 88.9 |
| C-2 | 1M $LiPF_6$ in EC/VC/MEC<br>Adiponitrile (2)<br>Ethylene sulfite (2) | 1.00 | 90.2 |
| C-3 | 0.9M $LiPF_6$ + 0.1M $LiN(SO_2CF_3)_2$ in EC/VC/MEC<br>Adiponitrile (2)<br>Ethylene sulfite (2) | 1.00 | 89.4 |
| C-4 | 0.9M $LiPF_6$ + 0.1M $LiBF_4$ in EC/VC/MEC<br>Adiponitrile (2)<br>Ethylene sulfite (2) | 1.00 | 89.7 |
| C-5 | 1M $LiPF_6$ in EC/VC/MEC<br>Adiponitrile (2)<br>1,3-Propanesultone (2) | 1.00 | 89.8 |
| C-6 | 1M $LiPF_6$ in EC/VC/MEC<br>Adiponitrile (2)<br>Divinylsulfone (0.3) | 1.00 | 89.4 |
| C-7 | 1M $LiPF_6$ in EC/VC/MEC<br>Adiponitrile (2)<br>Propargyl methanesulfonate (0.5) | 1.00 | 89.3 |
| C-8 | 1M $LiPF_6$ in EC/VC/MEC<br>Propionitrile (2)<br>Ethylene sulfite (2) | 1.00 | 88.2 |
| Comparison C-1 | 1M $LiPF_6$ in EC/VC/MEC<br>None<br>None | 1.00 | 83.7 |
| Comparison C-2 | 1M $LiPF_6$ in EC/VC/MEC<br>None<br>Ethylene sulfite (2) | 1.00 | 84.2 |

What is claimed is:

1. A non-aqueous electrolytic solution, comprising:
a non-aqueous solvent comprising from 30 to 50 volume percent of a cyclic carbonate, based on a total volume of the non-aqueous solvent;
from 0.5 to 1.5 M of at least one electrolyte selected from the group consisting of $LiPF_6$ and $LiBF_4$;
from 0.01 to 3% by weight of adiponitrile, based on a total weight of the non-aqueous electrolytic solution; and
from 0.2 to 3% by weight of at least one S=O group-containing compound selected from the group consisting of ethylenesulfite, 1,3-propanesultone, divinylsulfone, and propargyl methanesulfonate, based on a total weight of the non-aqueous electrolytic solution.

2. The non-aqueous electrolytic solution of claim 1, wherein the cyclic carbonate comprises ethylene carbonate.

3. The non-aqueous electrolytic solution of claim 1, wherein the electrolyte comprises $LiPF_6$.

4. The non-aqueous electrolytic solution of claim 1, wherein the S=O group-containing compound comprises 1,3-propanesultone.

5. A lithium secondary battery, comprising:
a positive electrode;
a negative electrode comprising a carbonaceous material of graphite crystal structure having a lattice distance of lattice surface (002) of 0.34 nanometer or less; and
the non-aqueous electrolytic solution of claim 1.

6. The lithium secondary battery of claim 5, wherein the positive electrode comprises a lithium element and a complex metal oxide comprising one metal element selected from the group consisting of cobalt, manganese, nickel, chromium, iron, and vanadium.

7. The lithium secondary battery of claim 6, wherein the complex metal oxide comprises at least one selected from the group consisting of $LiCoO_2$, $LiMn_2O_4$, $LiNiO_2$ and $LiCO_{1-x}Ni_xO_2$ (0.01<x<1).

8. A lithium secondary battery, comprising:
a positive electrode;
a negative electrode comprising a carbonaceous material of graphite crystal structure having a lattice distance of lattice surface (002) of 0.34 nanometer or less; and
the non-aqueous electrolytic solution of claim 2.

9. The lithium secondary battery of claim 8, wherein the positive electrode comprises a lithium element and a complex metal oxide comprising one metal element selected from the group consisting of cobalt, manganese, nickel, chromium, iron, and vanadium.

10. The lithium secondary battery of claim 9, wherein the complex metal oxide comprises at least one selected from the group consisting of $LiCoO_2$, $LiMn_2O_4$, $LiNiO_2$ and $LiCO_{1-x}Ni_xO_2$ (0.01<x<1).

11. A lithium secondary battery, comprising:
a positive electrode;
a negative electrode comprising a carbonaceous material of graphite crystal structure having a lattice distance of lattice surface (002) of 0.34 nanometer or less; and
the non-aqueous electrolytic solution of claim 3.

12. The lithium secondary battery of claim 11, wherein the positive electrode comprises a lithium element and a complex metal oxide comprising one metal element selected from the group consisting of cobalt, manganese, nickel, chromium, iron, and vanadium.

13. The lithium secondary battery of claim 12, wherein the complex metal oxide comprises at least one selected from the group consisting of $LiCoO_2$, $LiMn_2O_4$, $LiNiO_2$ and $LiCO_{1-x}Ni_xO_2$ (0.01<x<1).

14. A lithium secondary battery, comprising:
a positive electrode;
a negative electrode comprising a carbonaceous material of graphite crystal structure having a lattice distance of lattice surface (002) of 0.34 nanometer or less; and
the non-aqueous electrolytic solution of claim 4.

15. The lithium secondary battery of claim 14, wherein the positive electrode comprises a lithium element and a complex metal oxide comprising one metal element selected from the group consisting of cobalt, manganese, nickel, chromium, iron, and vanadium.

16. The lithium secondary battery of claim 15, wherein the complex metal oxide comprises at least one selected from the group consisting of $LiCoO_2$, $LiMn_2O_4$, $LiNiO_2$ and $LiCO_{1-x}Ni_xO_2$ (0.01<x<1).

* * * * *